(12) United States Patent
Yang et al.

(10) Patent No.: US 9,602,199 B2
(45) Date of Patent: Mar. 21, 2017

(54) METHOD OF MEASURING OPTICAL FIBER LINK CHROMATIC DISPERSION BY FRACTIONAL FOURIER TRANSFORMATION (FRFT)

(71) Applicant: Beijing Institute of Technology, Beijing (CN)

(72) Inventors: Aiying Yang, Beijing (CN); Xiaoyu Chen, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 14/954,036

(22) Filed: Nov. 30, 2015

(65) Prior Publication Data
US 2016/0211916 A1    Jul. 21, 2016

(30) Foreign Application Priority Data
Dec. 10, 2014  (CN) .......................... 2014 1 0752087

(51) Int. Cl.
*H04B 10/04*  (2006.01)
*H04B 10/06*  (2006.01)
(Continued)

(52) U.S. Cl.
CPC ... *H04B 10/07951* (2013.01); *H04B 10/6161* (2013.01)

(58) Field of Classification Search
None
See application file for complete search history.

(56) References Cited

U.S. PATENT DOCUMENTS 6,252,692 B1 * 6/2001 Roberts .............. H04B 10/2513
    398/147
8,594,499 B1 * 11/2013 Roberts ................ H04B 10/073
    398/28
(Continued)

FOREIGN PATENT DOCUMENTS

CN    101964767    2/2011
CN    102664685    9/2012
(Continued)

OTHER PUBLICATIONS

Search Report, issued by the State Intellectual Property Office of China, for corresponding Chinese patent application No. 201410752087.8; 2 pages, Aug. 3, 2016.
(Continued)

*Primary Examiner* — Oommen Jacob
(74) *Attorney, Agent, or Firm* — Faegre Baker Daniels LLP

(57) ABSTRACT

The present invention relates to a method of measuring optical fiber link chromatic dispersion by fractional Fourier transformation (FRFT), belonging to the technical field of optical communication. The method of the present invention performs coherent demodulation for an optical pulse signal output from the optical fiber link to obtain a complex field of the optical pulse signal, then performs FRFT on the complex field; according to the energy focusing effect of the chirp signal in the fractional spectrum, calculates an optimal fractional order of the FRFT, and then calculates chromatic dispersion of the optical fiber link according to the optimal fractional order. The method can be applied to an optical fiber communication system consisting of different types of optical fibers, to perform monitoring of optical fiber link chromatic dispersion.

2 Claims, 5 Drawing Sheets

(51) Int. Cl.
  *H04B 10/40* (2013.01)
  *H04B 10/079* (2013.01)
  *H04B 10/61* (2013.01)

(56) References Cited

U.S. PATENT DOCUMENTS

| | | | | |
|---|---|---|---|---|
| 2002/0089733 | A1* | 7/2002 | Gopalakrishnan | G02F 1/2255 359/254 |
| 2003/0086713 | A1* | 5/2003 | Inui | H04B 10/2519 398/199 |
| 2003/0137652 | A1* | 7/2003 | Mori | G01M 11/338 356/73.1 |
| 2004/0220986 | A1* | 11/2004 | Pisoni | G06F 17/141 708/403 |
| 2004/0254969 | A1* | 12/2004 | Pisoni | H04L 27/2662 708/404 |
| 2005/0089243 | A1* | 4/2005 | Ludwig | G02B 7/36 382/280 |
| 2005/0111852 | A1* | 5/2005 | Mahgerefteh | G02B 5/281 398/187 |
| 2005/0244164 | A1* | 11/2005 | Miyashita | H04B 10/25253 398/147 |
| 2007/0103362 | A1* | 5/2007 | Arikan | G01S 13/524 342/195 |
| 2008/0055726 | A1 | 3/2008 | Ludwig | |
| 2009/0297140 | A1* | 12/2009 | Heismann | G01M 11/333 398/16 |
| 2010/0021179 | A1* | 1/2010 | Kikuchi | H04B 10/61 398/183 |
| 2015/0180577 | A1* | 6/2015 | Wang | H04B 10/27 398/58 |
| 2016/0099777 | A1* | 4/2016 | Liu | H04B 10/2513 398/159 |
| 2016/0099782 | A1* | 4/2016 | Kuang | H04B 10/25133 398/136 |
| 2016/0211916 | A1* | 7/2016 | Yang | H04B 10/6161 |

FOREIGN PATENT DOCUMENTS

| | | |
|---|---|---|
| CN | 103227682 | 7/2013 |
| CN | 103578466 | 2/2014 |
| CN | 105071858 | 11/2015 |

OTHER PUBLICATIONS

English translation of the Search Report, issued by the State Intellectual Property Office of China, for corresponding Chinese patent application No. 201410752087.8; 2 pages, Aug. 3, 2016.

China Master Theses Full-text Database Information Science, Study on a Receiver-ended Optical Signal Pre-processing Technique based on Fractional Fourier Transform in Optical Communications; dated Jun. 15, 2014; 1136-77.

First Office Action, issued by the State Intellectual Property Office of China, dated Aug. 3, 2016 for corresponding Chinese patent application 201410752087.8; 4 pages.

English translation of the First Office Action, issued by the State Intellectual Property Office of China, dated Aug. 3, 2016 for corresponding Chinese patent application 201410752087.8; 3 pages.

* cited by examiner

METHOD OF MEASURING OPTICAL FIBER LINK CHROMATIC DISPERSION BY FRACTIONAL FOURIER TRANSFORMATION (FRFT)

The present application claims a priority of a Chinese patent application that was filed to the China Patent Office on Dec. 10, 2014, with the application No. 201410752087.8 and has the invention title "METHOD OF MEASURING OPTICAL FIBER LINK CHROMATIC DISPERSION BY FRACTIONAL FOURIER TRANSFORMATION (FRFT)", of which all contents are incorporated by reference into the present application.

TECHNICAL FIELD

The present invention relates to a method of measuring optical fiber link chromatic dispersion by fractional Fourier transformation (FRFT), belonging to the technical field of high-speed optical communication. The method can be applied to an optical fiber communication system consisting of different types of optical fibers, to perform monitoring the chromatic dispersion of an optical fiber link.

BACKGROUND OF THE INVENTION

After monochromatic light is data modulated, the frequency spectrum of the light is broadened, and different frequency components have different transmission speeds, causing that light with different frequencies arrive at different time, i.e., chromatic dispersion effect. In an optical fiber digital communication system, chromatic dispersion effect causes an optical pulse to be broadened, thereby limiting the highest rate the system can transmit. Modulation format and symbol rate of an optical signal both affect the chromatic dispersion that an optical communication can tolerate very greatly. For example, for a 10 Gbps optical fiber communication system, the non-compensation transmission distance of a standard single mode optical fiber is about 60 km, and a transmission distance for a 40 Gbps system is only 3.5 km. Therefore, in the optical fiber communication system and network, it is necessary to monitor in real-time and equalize the chromatic dispersion of the optical fiber link. Traditional methods for measuring an optical fiber chromatic dispersion mainly include a frequency spectrum analysis method, a vestigial sideband filter method, a non-linear spectral analysis method and the like.

The frequency spectrum analysis method mainly includes a radio frequency (RF) pilot method and a clock frequency method. In the RF pilot method, an RF pilot is used as a monitoring object, and the frequency spectrum width of an RF pilot is narrower than that of an optical signal is added into a transmitter. In the optical fiber transmission, a pilot goes through the same chromatic dispersion as the signal. In the case without chromatic dispersion, upper and lower sidebands of the pilot are of the same phase, and the reception power is maximum; when there is chromatic dispersion, the upper and lower sidebands of the pilot have a phase difference, attenuation of RF power occurs at a receiver end, and chromatic dispersion is measured by measuring the pilot power. If the pilot frequency is high, the sensitivity of monitoring is high, but the range that can be monitored becomes small; conversely, the range to be monitored is large, and the sensitivity is low, constituting a pair of contradictions. Loading both a high-frequency pilot and a low-frequency pilot can improve the dynamic range and sensitivity of chromatic dispersion monitoring. Chromatic dispersion monitoring with pilot modulation has limitations in that it is impossible to distinguish between positive or negative chromatic dispersion, and it is necessary to change the transmitter. The clock frequency method measures chromatic dispersion by extracting the clock frequency component of an optical signal to be measured and monitoring the change of the clock frequency spectrum power. As for the measurement of optical fiber chromatic dispersion by extracting a clock frequency component, although it is not necessary to change the transmitter, it is still impossible to distinguish between positive or negative chromatic dispersion.

The vestigial sideband filter method uses a band-pass filter to filter upper and lower sidebands of the optical signal, and can measure chromatic dispersion of an optical fiber by detecting a time delay difference between two vestigial sideband signals. After optical-electric conversion, phases of the two vestigial sideband signals are detected to obtain a phase difference between the two signals, thereby indirectly measuring the optical fiber chromatic dispersion. In the vestigial sideband filter method, it is not necessary to change the transmitter, the sensitivity is high, positive or negative chromatic dispersion can be distinguished, and is free from polarization mode chromatic dispersion, non-linear birefraction and chirp. However, the bandwidth of the band-pass filter is equal to a bit rate of the signal, and is opaque to the signal rate.

Principle of the non-linear spectral analysis method is that: chromatic dispersion causes the broadening to the time domain pulse of an optical signal to be broadened and reduces the peak power, making the non-linear effect caused by the optical fiber be reduced, thus the optical power passing through the band-pass filter will be reduced, therefore, change of chromatic dispersion can be monitored by measuring the change of the optical power subsequent to the filter. The non-linear spectral analysis method has the limitation that it is impossible to distinguish positive and negative chromatic dispersions, and the interaction between the chromatic dispersion and non-linearity may affect the accuracy of chromatic dispersion monitoring.

The above-described methods have respective defects, thus it is impossible to perform a chromatic dispersion monitoring without interference and with transparent modulation format and transparent signal rate. Therefore, it is a current difficulty that urgently needs to be solved as for how to accurately test chromatic dispersion of an ultra-high speed optical fiber communication link in real time without interference.

SUMMARY OF THE INVENTION

It is an object of the invention to solve a problem of accurately testing chromatic dispersion of an ultra-high speed optical fiber communication link in real time without interference, there is proposed a method of measuring optical fiber link chromatic dispersion by fractional Fourier transformation (FRFT), which can accurately measure chromatic dispersion of the optical fiber link.

The object of the invention is achieved by adopting the following technical solution.

The main idea of the method of measuring optical fiber link chromatic dispersion by FRFT is that chromatic dispersion of the optical fiber link causes an optical pulse signal to become a chirp signal; based on the phenomenon of a chirped signal having an energy focusing effect in the FRFT, first calculating an optimal fractional order of the FRFT, followed by calculating the chromatic dispersion of an optical fiber link based on the optimal fractional order; specifically, steps are as follows:

step one, performing coherent demodulation for an optical signal propagating through an optical fiber link to obtain a real part $E_I$ and an imaginary part $E_Q$ of an electric field of the optical signal, and next, calculating the complex electric field of the optical signal by $E=E_I+jE_Q$, where j is an imaginary unit;

step two: performing FRFT for the complex field of the optical pulse signal obtained in the step 1, according to the energy focusing effect of the fractional spectrum of the chirp signal, searching for an optimal fractional order $\rho_{optimum}$ of the FRFT, and methods of searching for the optimal fractional order include a fractional order spectrum entropy, an optimal filtering operator, maximizing a density of zero-center normalized instantaneous amplitude spectrum, maximizing a variance of fractional-order amplitude spectrum;

step three: calculating chirps of the optical pulse signal; specifically comprises: according to the optimal fractional order $\rho_{optimum}$ obtained in the step 2, calculating a chirp coefficient of the optical pulse signal, that is, $$C = -\frac{\cot\left(\frac{\pi}{2}\rho_{optimum}\right)}{2\pi S^2},$$

where S is a scale factor in the FRFT, and the value thereof is $S\sqrt{N}$, N the number of samples of a signal;

step four: calculating chromatic dispersion of the optical fiber link as $$-\frac{2\pi \times 3.0 \times 10^8 \times C}{\lambda_0^2},$$

wherein $\lambda_0$ is the central wavelength of the optical pulse signal.

The method for searching for the optimal fractional order $\rho_{optimum}$ of the FRFT includes maximizing a variance of a fractional amplitude spectrum, comprising calculating a variance of a fractional spectrum amplitude obtained from FRFT with different fractional order, a fractional order corresponding to the maximum value of the variance of a fractional spectrum amplitude is an optimal fractional order $\rho_{optimum}$; specifically, a fractional order $\rho_i$ changes to $\rho_i = \rho_{i-1}+\Delta$ in a range of [0, 2] based on a fixed step length $\Delta$, $\rho_i = \rho_{i-1}+\Delta$, performing FRFT for each fractional order, respectively, calculating a variance $\sigma_i$ of an amplitude spectrum of each FRFT, further calculating the maximum value of all of the variances of the amplitude spectrum, and the resulting fractional order corresponding to the maximum value of the variance of the amplitude spectrum is an optimum fractional order $\rho_{optimum}$.

Beneficial Effect

1. The optical fiber link chromatic dispersion measurement system designed in accordance with the method of the present invention can accurately measure chromatic dispersion, with broad measurement range and low measurement error;
2. The optical fiber link chromatic dispersion measurement system designed in accordance with the method of the present invention has a simple structure, is easy to be implemented and it is not necessary to change the transmitter.
3. The present invention is applicable to multiple modulation formats and different transmission rates comprising OOK, QPSK, QAM and the like;
4. The optical fiber link chromatic dispersion measurement system designed in accordance with the method of the present invention has a simple measurement method, and the measurement parameters are easy to be determined.

Therefore, the present invention complies with the requirements of monitoring chromatic dispersion by a high-speed optical fiber communication link and an optical network, can be applied to monitor and equalize chromatic dispersion in the high-speed optical fiber communication system.

The method of the present invention is applied to the optical fiber communication link for performing optical fiber chromatic dispersion monitoring; and it is suitable for the optical fiber communication link with different types of optical fibers, multiple modulation formats and multiple symbol rates. The present invention is simple to be integrated, satisfies the requirement of online, interference-free and real-time monitoring of optical fiber communication links, and can conveniently and accurately monitor the chromatic dispersion of an optical fiber.

DETAILED DESCRIPTION OF THE EMBODIMENT

For better descriptions of object and advantages of the present invention, further descriptions of Summary of the Invention are provided in conjunction with the drawings and embodiment below.

Figure 1:
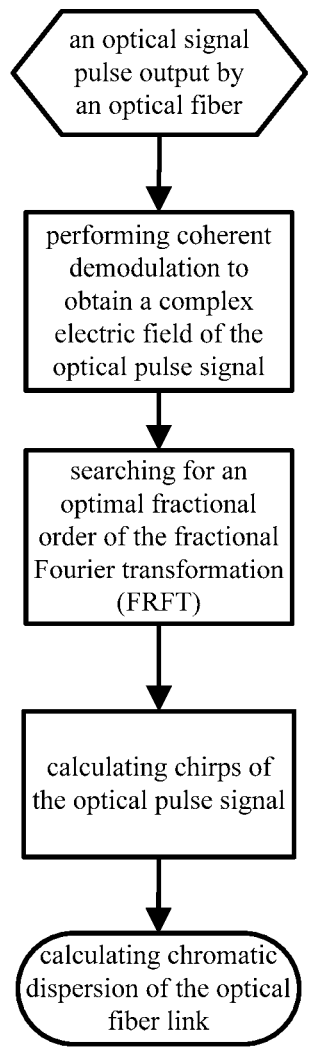
FIG. 1 is a flowchart of a method of measuring optical fiber link chromatic dispersion by FRFT in claim 1 of the present invention.
Figure 2:
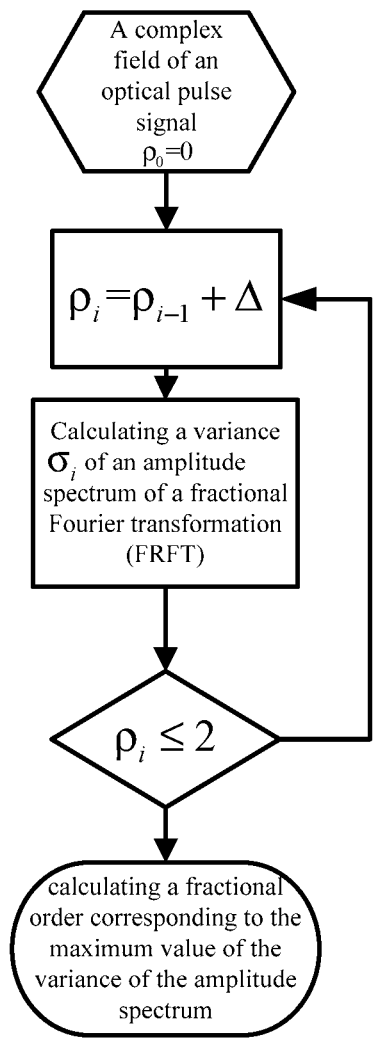
FIG. 2 is a flowchart of a method of searching for an optimal fractional order in claim 2 of the present invention.

The flow of measuring optical fiber link chromatic dispersion by FRFT of the method of the present invention is as shown in FIG. 1.

In specific implementation, the optical fiber link chromatic dispersion can be tested without interference by using a FRFT optical fiber link chromatic dispersion testing system. The effect of measurement is independent of a type of an optical fiber, a modulation format of an optical fiber link signal, or a rate, and is more applicable to the real-time monitoring of the current high-speed optical fiber link chromatic dispersion.

Figure 3:
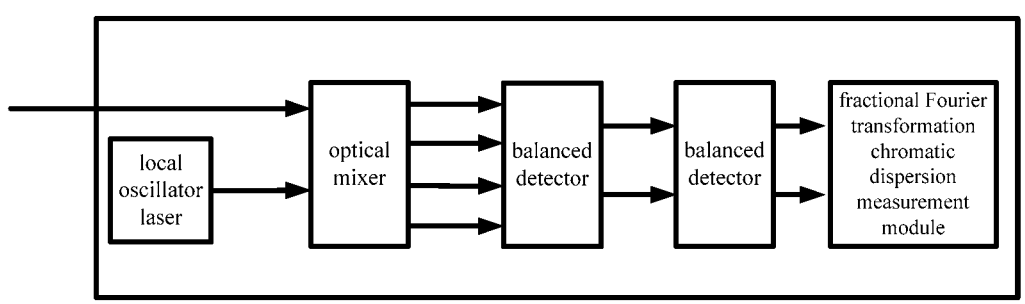
FIG. 3 is a structural schematic of a system of measuring optical fiber link chromatic dispersion by FRFT in the specific embodiment.
Figure 4:
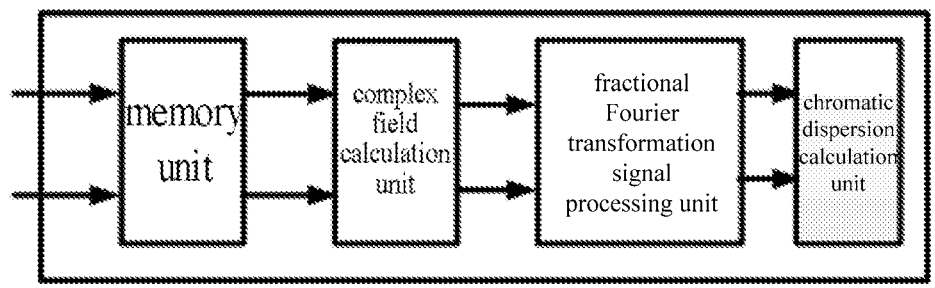
FIG. 4 is a structural diagram of a chromatic dispersion calculation module of FRFT in the specific embodiment.

The embodiment provides a system of measuring optical fiber link chromatic dispersion by FRFT, as shown in FIG. 3, comprising a local oscillator laser, an optical mixer, a balanced detector, an analog-digital converter, and a fractional Fourier transformation (FRFT) chromatic dispersion measurement module; wherein, the fractional Fourier transformation chromatic dispersion measurement module is as shown in FIG. 4, comprising a memory unit, a complex field calculation unit, a fractional Fourier transformation signal processing unit and a chromatic dispersion calculation unit.

The above modules are in a connection relation as follows: an output end of the local oscillator laser is connected to one input end of the optical mixer, a four-way output of the optical mixer connects the balanced detector, a two-way output of the balanced detector connects the analog-digital converter, and the two-way output of the analog-digital converter connects the fractional Fourier transformation chromatic dispersion measurement module.

Mixing the optical pulse signals output by the optical fiber link and the output of the local oscillator laser in the optical mixer, obtaining a real part $E_I$ and an imaginary part $E_Q$ of an electric field of the optical pulse signal through the balanced detector, which enter the fractional Fourier transformation chromatic dispersion measurement module after the analog-digital conversion, to calculate the optical fiber chromatic dispersion.

In the fractional Fourier transformation chromatic dispersion measurement module, the complex field of optical pulse signal obtained by a complex field calculation unit is:

$$E = E_I + jE_Q$$

wherein j is an imaginary unit.

Figure 5:
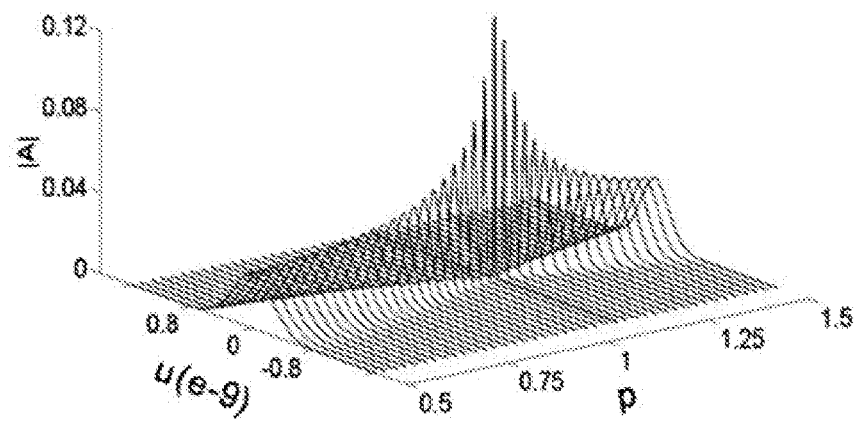
FIG. 5 is a diagram of a fractional spectrum amplitude obtained from the optical pulse output from the optical fiber that is subjected to FRFT of different orders.

In the fractional Fourier transformation signal processing unit, the fractional order $\rho_i$ changes to $\rho_i = \rho_{i-1} + \Delta$ in a range of [0, 2] based on a fixed step length $\Delta$, corresponding to each fractional order, performs FRFT on the complex fields of the optical pulse signal, respectively, to obtain a variance $\sigma_i$ of an amplitude spectrum of each FRFT, then calculates the maximum value of all of the variances of the amplitude spectrum, the resulting fractional order corresponding to the maximum value of the variance of the amplitude spectrum is an optimal fractional order $\rho_{optimum}$. FIG. 5 shows an amplitude spectrum of the FRFT of the complex fields of the optical pulse, a variance of an amplitude spectrum of an energy focused fractional spectrum is the maximum, and the corresponding fractional order is the optimal fractional order $\rho_{optimum}$. The chirp coefficient of the optical pulse signal is calculated by the optimal fractional order as follows:

$$C = -\frac{\cot\left(\frac{\pi}{2}\rho_{optimum}\right)}{2\pi S^2}$$

wherein, S is a scale factor in the FRFT, the value thereof is $S = \sqrt{N}$, and N is the number of samples of a signal.

In the chromatic dispersion calculation module, the total chromatic dispersion of the optical fiber link is obtained as follows:

$$DL = \frac{2\pi \times 3.0 \times 10^8 \times C}{\lambda_0^2}$$

wherein, $\lambda_0$ is the central wavelength of the optical pulse signal.

Figure 6:
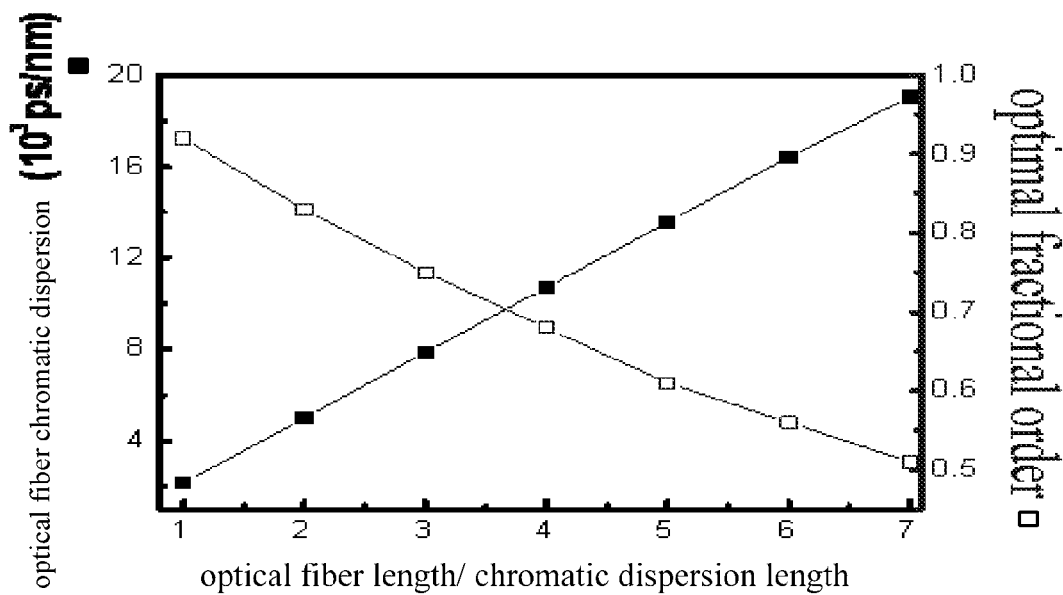
FIG. 6 is the optimal fractional order of an optical pulse output from optical fibers with different lengths that is subjected to FRFT and the correspondingly measured optical fiber chromatic dispersion value in the specific embodiment.
Figure 7:
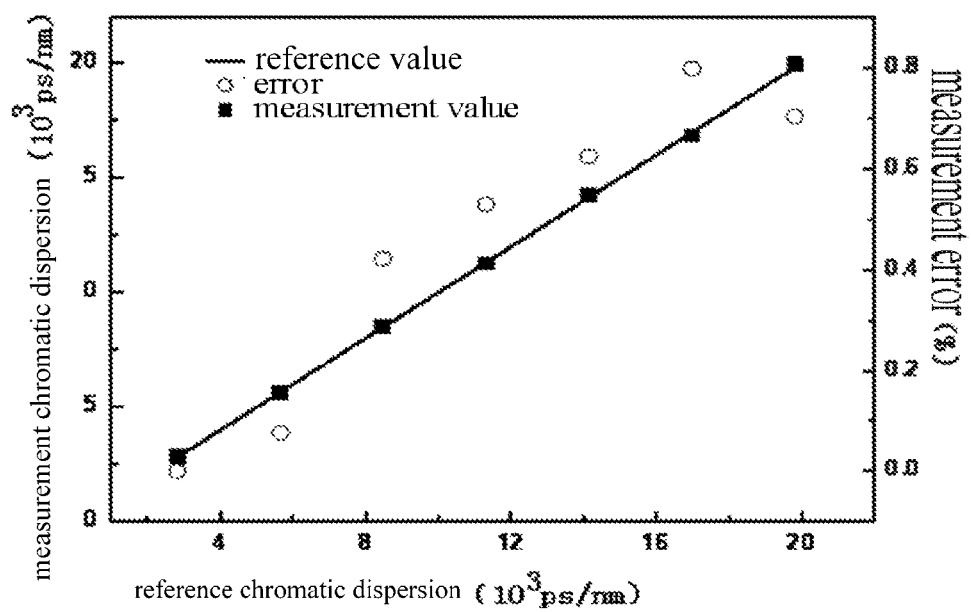
FIG. 7 is a chromatic dispersion result measured in the FRFT method after the optical pulse is subjected to a standard single mode optical fiber transmission with different lengths in the specific embodiment.
Figure 8:
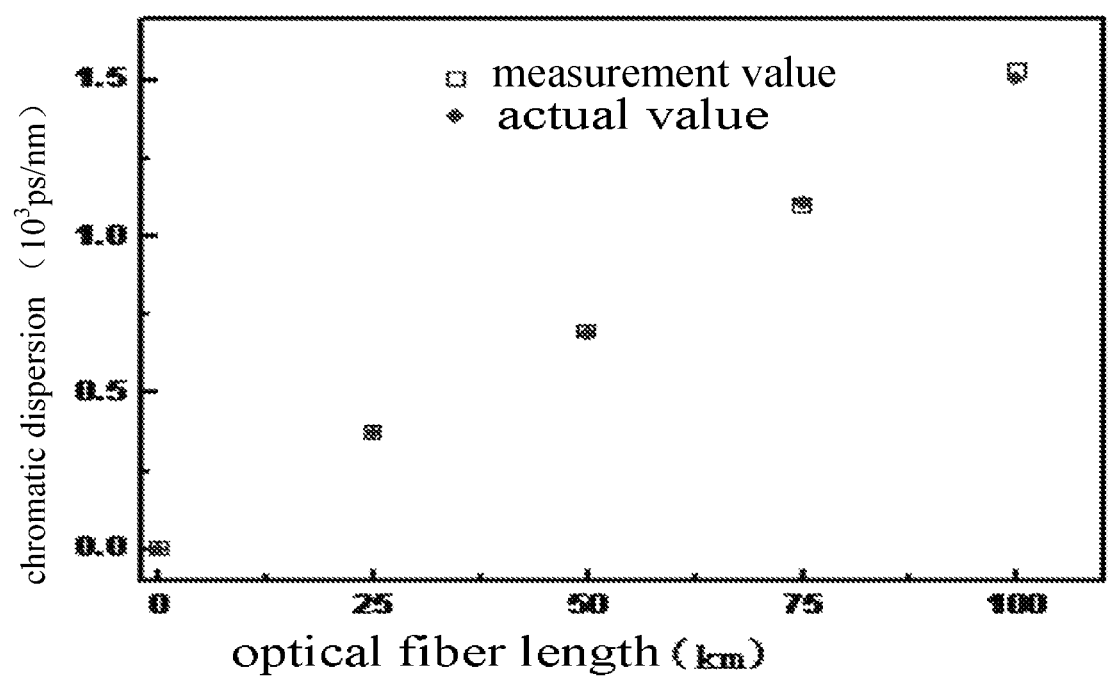
FIG. 8 is a comparison between a chromatic dispersion value measured in the FRFT method and an actual chromatic dispersion value, after a 10 Gbit/s OOK optical signal having the carrier wave length of 1550 nm is subjected to a standard single mode optical fiber transmission with different lengths.

FIG. 6 is the optimal fractional order of an optical pulse output from optical fibers that is subjected to FRFT and the measured optical fiber chromatic dispersion value, after the optical pulse with a pulse width of 100 picoseconds is subjected to a standard mono-mode optical fiber transmission with different lengths. In FIG. 7, the X axis denotes the actual chromatic dispersion values of the optical fiber, which serve as reference values; at the left side the Y axis denotes chromatic dispersion values measured by the FRFT optical fiber chromatic dispersion measurement system designed in accordance with the method of the present invention, the solid line serving as a reference line; and at the right side the Y axis denotes measurement errors. FIG. 8 shows a comparison between a chromatic dispersion value measured in the FRFT method and an actual chromatic dispersion value, after a 10 Gbit/s OOK optical signal having the carrier wave length of 1550 nm is subjected to a standard mono-mode optical fiber transmission with different lengths. It can be seen from the results of FIGS. 7 and 8 that the method of the present invention can accurately measure chromatic dispersion values of the optical fiber link with different lengths.

The present invention has main technological advantages as below:

Hereinbefore, "method of measuring optical fiber link chromatic dispersion by fractional Fourier transformation (FRFT)" of the present invention has been described in details, but specific embodiments of the invention are not limited thereto. Those embodiments are described merely for helping to understand the method and core concept of the present invention. In addition, a person skilled in the art can, on the basis of the concept of the invention, make modifications to both the specific embodiments and the application scope. In conclusion, contents disclosed herein should not be understood as limitations to the present invention. A variety of obvious changes made hereto without departing from the spirit of the method of the present invention and the scopes of the claims fall within the protection scope of the present invention.

The invention claimed is:

1. A method of measuring optical fiber link chromatic dispersion by fractional Fourier transformation (FRFT), comprising:
   step one, performing coherent demodulation for an optical signal propagating through an optical fiber link to obtain a real part $E_I$ and an imaginary part $E_Q$ of an electric field of the optical signal, and next, calculating the complex electric field of the optical signal by $E = E_I + jE_Q$, where j is an imaginary unit;
   step two: performing FRFT for the complex field of the optical pulse signal obtained in the step 1, according to the energy focusing effect of the fractional spectrum of the chirp signal, searching for an optimal fractional order $\rho^{optimum}$ of the FRFT, wherein methods of searching for the optimal fractional order include a fractional order spectrum entropy, an optimal filtering operator, maximizing a density of zero-center normalized instantaneous amplitude spectrum, and maximizing a variance of fractional-order amplitude spectrum;
   step three: calculating chirps of the optical pulse signal according to the optimal fractional order $\rho_{optimum}$ obtained in the step 2, comprising calculating a chirp coefficient of the optical pulse signal, that is $$C = -\frac{\cot\left(\frac{\pi}{2}\rho_{optimum}\right)}{2\pi S^2},$$

where S is a scale factor in the FRFT, and the value thereof is $S=\sqrt{N}$, N the number of samples of a signal; and step four: calculating chromatic dispersion of the optical fiber link as $$-\frac{2\pi \times 3.0 \times 10^8 \times C}{\lambda_0^2},$$

wherein is $\lambda_0$ the central wavelength of the optical pulse signal.

2. The method of measuring optical fiber link chromatic dispersion by FRFT according to claim 1, wherein, the method for searching for the optimal fractional order $\rho_{optimum}$ of the FRFT includes maximizing a variance of a fractional amplitude spectrum, comprising calculating a variance of a fractional spectrum amplitude obtained from FRFT with different fractional order, a fractional order corresponding to the maximum value of the variance of a fractional spectrum amplitude is an optimal fractional order $\rho_{optimum}$; specifically, a fractional order $\rho_i$ changes to $\rho_i = \rho_{i-1}+\Delta$ in a range of [0, 2] based on a fixed step length $\Delta$, performing FRFT for each fractional order, respectively, calculating a variance $\sigma_i$ of an amplitude spectrum of each FRFT, further calculating the maximum value of all of the variances of the amplitude spectrum, and the resulting fractional order corresponding to the maximum value of the variance of the amplitude spectrum is an optimum fractional order $\rho_{optimum}$.

* * * * *